(12) United States Patent
Querejeta Andueza

(10) Patent No.: US 9,791,063 B2
(45) Date of Patent: Oct. 17, 2017

(54) GAS SHUT-OFF VALVE

(71) Applicant: COPRECITEC, S.L., Aretxabaleta (ES)

(72) Inventor: Félix Querejeta Andueza, Hendaye (FR)

(73) Assignee: COPRECI, S. COOP, Aretxbaleta (ES)

( * ) Notice: Subject to any disclaimer, the term of this patent is extended or adjusted under 35 U.S.C. 154(b) by 71 days.

(21) Appl. No.: 14/633,138

(22) Filed: Feb. 27, 2015

(65) Prior Publication Data

US 2016/0109028 A1 Apr. 21, 2016

(30) Foreign Application Priority Data

Oct. 17, 2014 (EP) .................................... 14382403

(51) Int. Cl.
*F16K 31/06* (2006.01)
*F23N 1/00* (2006.01)
(Continued)

(52) U.S. Cl.
CPC ........ *F16K 31/0655* (2013.01); *F16K 3/0254* (2013.01); *F16K 31/0644* (2013.01);
(Continued)

(58) Field of Classification Search
CPC .. F16K 31/0644; F16K 31/0655; F16K 31/44; F16K 35/025; F16K 35/022; F16K 35/02; F23K 5/007; F23K 2900/05002; F23N 1/00; F23N 2035/14; F23N 2035/22; F23N 2035/24; F23N 2035/18;
(Continued)

(56) References Cited

U.S. PATENT DOCUMENTS 2,288,417 A * 6/1942 Paille ...................... F23N 5/107
137/628
2,309,709 A * 2/1943 Paille ...................... F23N 5/107
137/66

(Continued)

FOREIGN PATENT DOCUMENTS

CA 2020680 C 1/1992
DE 202014100793 U1 3/2014
(Continued)

OTHER PUBLICATIONS

European Extended Search Report and Opinion for EP Patent Application No. 14382403.5, prepared by the European Patent Office and dated Apr. 8, 2015, 7 pages, Munich Germany.

*Primary Examiner* — Mary McManmon
*Assistant Examiner* — David Colon Morales
(74) *Attorney, Agent, or Firm* — Edell, Shapiro & Finnan LLC

(57) ABSTRACT

A shut-off valve that has a closure orifice, a closure member to open and close a gas passage through the shut-off valve, an electromagnetic actuator including a movable assembly attached to the closure member, the closure member, and an electromagnetic filed generator magnetically associated with the movable assembly. The shut-off valve also includes a manual actuator for acting on the movable assembly, the manual actuator comprising an open position in which it is decoupled from the movable assembly, the electromagnetic actuator thus being able to act on the closure member to cause its closure.

44 Claims, 13 Drawing Sheets

(51) Int. Cl.

| | | |
|---|---|---|
| *F16K 35/02* | (2006.01) | |
| *F23K 5/00* | (2006.01) | |
| *F16K 3/02* | (2006.01) | |
| *F16K 31/44* | (2006.01) | |
| *F24C 3/12* | (2006.01) | |
| *G05D 7/06* | (2006.01) | |

(52) U.S. Cl.
CPC .......... *F16K 31/0668* (2013.01); *F16K 31/44* (2013.01); *F16K 35/025* (2013.01); *F23K 5/007* (2013.01); *F23N 1/00* (2013.01); *F24C 3/122* (2013.01); *G05D 7/0635* (2013.01); *F23K 2900/05002* (2013.01); *F23N 2035/14* (2013.01); *F23N 2035/22* (2013.01); *F23N 2035/24* (2013.01); *Y10T 137/1842* (2015.04)

(58) Field of Classification Search
CPC ......... F24C 3/122; F24C 3/12; G05D 7/0635; Y10T 137/1842; Y10T 137/1915; Y10T 137/1963; Y10T 137/1939
USPC ...... 251/65, 129.01, 129.03, 129.04, 129.15, 251/129.19, 129.2, 319–323
See application file for complete search history.

(56) References Cited

U.S. PATENT DOCUMENTS

| | | | | |
|---|---|---|---|---|
| 2,371,351 | A | | 3/1945 | Paille |
| 2,547,098 | A | * | 4/1951 | Smith ................. F16K 31/0655 251/116 |
| 2,550,906 | A | * | 5/1951 | Britton .................... F16K 31/04 251/129.03 |
| 2,685,803 | A | * | 8/1954 | Weber ................. F16K 31/0655 137/66 |
| 2,695,154 | A | * | 11/1954 | Dillman ............. F16K 31/0655 251/129.03 |
| 2,873,069 | A | * | 2/1959 | Matthews ........... F16K 31/0679 137/66 |
| 2,895,545 | A | * | 7/1959 | Seegert .................... G05D 7/00 431/14 |
| 3,351,093 | A | * | 11/1967 | Frantz ................. F16K 31/0606 137/625.27 |
| 3,368,788 | A | * | 2/1968 | Padula ............... F16K 31/0658 251/129.15 |
| 3,392,740 | A | * | 7/1968 | Fleer .................... G05D 23/128 137/627 |
| 3,763,875 | A | | 10/1973 | Mobus et al. |
| 3,813,033 | A | * | 5/1974 | Caparone ................ F23N 5/105 236/9 R |
| 4,056,255 | A | * | 11/1977 | Lace .................... F16K 31/082 251/129.15 |
| 4,242,080 | A | * | 12/1980 | Tabei ....................... F23N 5/107 137/66 |
| 4,286,767 | A | * | 9/1981 | Hashimoto ........... F16K 31/082 251/129.15 |
| 4,434,933 | A | * | 3/1984 | Tamura ............... F16K 31/0655 236/75 |
| 4,512,546 | A | * | 4/1985 | Inada .................... F16K 31/082 251/129.02 |
| 4,543,974 | A | * | 10/1985 | Dietiker ................. F23N 5/105 137/66 |
| 4,679,017 | A | * | 7/1987 | Mishler .................. H01F 7/124 251/129.03 |
| 4,930,488 | A | * | 6/1990 | Pearman .................. F24C 3/12 126/39 BA |
| 4,962,750 | A | * | 10/1990 | Bridgewater ........... F24C 3/122 126/503 |
| 5,010,911 | A | * | 4/1991 | Grant .................... F16K 31/082 137/68.3 |
| 5,018,964 | A | * | 5/1991 | Shah ........................ F23N 5/203 431/45 |
| 5,126,934 | A | * | 6/1992 | MacFadyen .............. F17D 1/04 137/487.5 |
| 5,203,688 | A | | 4/1993 | Dietiker |
| 5,450,841 | A | | 9/1995 | Whitaker et al. |
| 5,860,446 | A | | 1/1999 | Hunt |
| 6,000,390 | A | | 12/1999 | Evers et al. |
| 6,289,792 | B1 | | 9/2001 | Grando et al. |
| 6,374,850 | B1 | * | 4/2002 | Timm ...................... A62C 2/04 137/39 |
| 6,517,045 | B1 | * | 2/2003 | Northedge ........... F16K 31/082 251/129.16 |
| 6,715,475 | B2 | * | 4/2004 | Cook ....................... F02M 26/48 123/568.21 |
| 6,860,288 | B2 | * | 3/2005 | Uhler ........................ F17D 5/06 137/312 |
| 7,011,076 | B1 | * | 3/2006 | Weldon .............. F02M 25/0836 123/516 |
| 7,347,221 | B2 | * | 3/2008 | Berger .................... F16K 1/443 137/614.18 |
| 7,637,476 | B2 | * | 12/2009 | Mugica ................... F23N 5/102 251/129.04 |
| 7,823,581 | B2 | * | 11/2010 | Velasquez ............. F24B 1/1808 126/503 |
| 8,857,466 | B1 | * | 10/2014 | Wilson ................... E03B 7/071 137/551 |
| 2004/0040547 | A1 | * | 3/2004 | Ivens ................. F16K 31/0655 123/520 |
| 2004/0226600 | A1 | * | 11/2004 | Starer .................... H01L 35/32 136/224 |
| 2006/0260603 | A1 | * | 11/2006 | Shah .................... A47J 37/0713 126/41 R |
| 2008/0241772 | A1 | * | 10/2008 | Zanella ................... F23N 1/005 431/75 |
| 2009/0159068 | A1 | * | 6/2009 | Querejeta ........... A47J 37/0786 126/25 R |
| 2009/0189102 | A1 | * | 7/2009 | Linden .................... F16K 17/38 251/129.01 |
| 2010/0255433 | A1 | * | 10/2010 | Querejeta Andueza ................ F23N 5/146 431/12 |
| 2011/0003258 | A1 | * | 1/2011 | Carlson .................. F23N 5/102 431/2 |
| 2011/0146649 | A1 | | 6/2011 | Brenner |
| 2011/0171587 | A1 | * | 7/2011 | Nowak .................... F23D 5/14 431/6 |
| 2012/0090177 | A1 | * | 4/2012 | Andueza ............... F16K 27/029 29/890.124 |
| 2012/0204853 | A1 | * | 8/2012 | Simmons .................. F24C 3/12 126/42 |
| 2012/0273705 | A1 | * | 11/2012 | Querejeta Andueza ............. F16K 31/0644 251/129.15 |
| 2012/0313019 | A1 | * | 12/2012 | Neudeck ............. F16K 31/082 251/65 |
| 2013/0153042 | A1 | * | 6/2013 | Young .................... F23N 1/005 137/14 |

FOREIGN PATENT DOCUMENTS

| | | |
|---|---|---|
| EP | 2423545 A1 | 2/2012 |
| EP | 2789280 A1 | 10/2014 |
| ES | 1085629 U | 7/2013 |
| WO | WO2014191289 A1 | 12/2014 |

* cited by examiner

GAS SHUT-OFF VALVE

CROSS-REFERENCE TO RELATED APPLICATIONS

This application relates to and claims the benefit and priority to European Appl. No. EP14382403, filed Oct. 17, 2014.

TECHNICAL FIELD

The present invention relates to gas appliances and systems for controlling gas appliances, both those appliances that consume gas and those appliances that distribute gas.

BACKGROUND

Gas appliances using shut-off valves to allow or to cut off the passage of a gas flow and comprising a control unit electrically operating the shut-off valve for opening or closing the gas flow are known.

U.S. Pat. No. 6,289,792 B1 discloses a gas cooking appliance comprising a main gas pipeline connected to an external gas supply, a shut-off valve arranged in the main pipeline for opening or closing the gas flow, and a control unit electrically operating the shut-off valve for opening or closing the gas flow.

SUMMARY OF THE DISCLOSURE

According to one implementation a shut-off valve is provided for opening or closing a gas flow and a control unit electrically operating the shut-off valve for opening or closing the gas flow. The shut-off valve comprises a closure orifice, a closure member cooperating with the closure orifice to open and close the gas passage, and an electromagnetic actuator operated by the control unit comprising a movable assembly which is attached to the closure member, the closure member moving integrally with the movable assembly. The electromagnetic actuator also comprises electromagnetic means which is magnetically associated with the movable assembly to allow causing the change in position of the movable assembly when the electromagnetic means is provided with electrical power. The shut-off valve also comprises a manual actuator for moving the movable assembly together with the closure member for opening or closing the gas flow, the manual actuator comprising an open position in which it is decoupled from the movable assembly, the electromagnetic actuator thus being able to act on the closure member to cause its closure.

The shut-off valve comprises an electromagnetic actuator and a manual actuator in a single device. According to some implementations the shut-off valve is a bistable valve wherein which the opening and closing the gas passage is achieved by means of electric pulses of different polarity being supplied to the electromagnetic means, and keeping the closure member in the open position of the gas passage in the event of absence of power supply being supplied to the electromagnetic actuator. In addition to the foregoing, there is also a manual actuator that allows opening and closing the gas passage. A feature of the manual actuator is that when it is in the open position, it is decoupled from the movable assembly, and therefore no longer plays a predominant role in the position of the closure member. This decoupling allows the electromagnetic actuator to act on the movable assembly to bring the closure member to the closed position upon the electromagnetic means receiving an electrical pulse from, for example, a controller.

The shut-off valve can therefore act like an emergency device, the user acting on the manual actuator for opening, and especially for closing the valve, when the gas passage urgently needs to be closed and the gas appliance does not have electric power. Also when the manual actuator is in the open position, the valve can be closed by operating the electromagnetic actuator. In the same manner, when the manual actuator is in the closed position, the shut-off valve cannot be opened by electric means because the manual actuator has a predominant position.

According to one implementation a shut-off valve is provided that comprises: an inlet conduit and an outlet conduit; a closure orifice disposed between the inlet conduit and the outlet conduit; a closure member movable between an open position and a closed position, in the open position the closure member is positioned away from the closure orifice to permit fluid communication between the inlet and outlet conduits, in the closed position the closure member interfaces with the closure orifice to prevent fluid communication between the inlet and outlet conduits; an electromagnetic actuator assembly comprising an electromagnetic field generator and a movable assembly to which the closure member is attached, the movable assembly being magnetically associated with the electromagnetic field generator and movable between first and second positions that respectively correspond to the closed and open positions of the closure member; a manual actuator capable of being coupled to and subsequently decoupled from the movable assembly, the manual actuator movable between a closed position and an open position, in the open position the manual actuator is decoupled from the movable assembly, in the closed position the manual actuator is coupled with the movable assembly; when the manual actuator is in the open position the movable assembly is configured to be moved between the first and second positions upon the electromagnetic field generator producing an electromagnetic field.

According to another implementation a shut-off valve is provided that comprises: an inlet conduit and an outlet conduit; a closure orifice disposed between the inlet conduit and the outlet conduit; a closure member movable between an open position and a closed position, in the open position the closure member is positioned away from the closure orifice to permit fluid communication between the inlet and outlet conduits, in the closed position the closure member interfaces with the closure orifice to prevent fluid communication between the inlet and outlet conduits; an electromagnetic actuator assembly comprising a movable assembly that is movable between first and second positions that respectively correspond to the closed and open positions of the closure member; a manual actuator capable of being coupled to and subsequently decoupled from the movable assembly and movable between an open position and a closed position; the shut-off valve being transitional between a first, a second and a third configuration, in the first configuration the manual actuator being in the open position and decoupled from the movable assembly with the closure member being in the open position, in the second configuration the manual actuator being in the open position and decoupled from the movable assembly with the closure member being in the closed position, and in the third position the manual actuator being in the closed position and coupled with the movable assembly with the closure member also being in the closed position.

DETAILED DESCRIPTION

Figure 1:
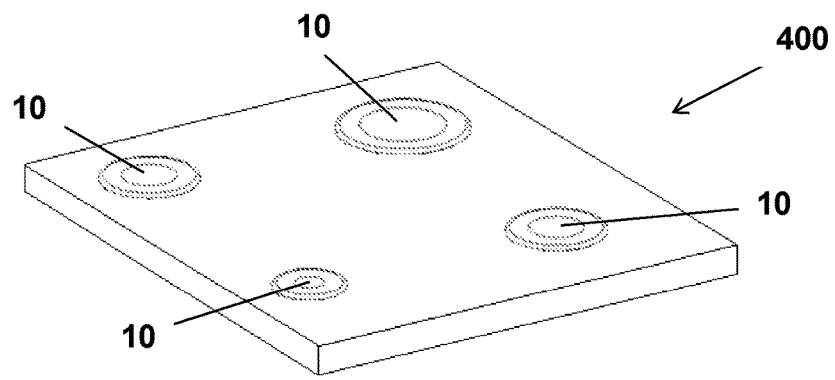
FIG. 1 shows a schematic view of a gas cooking appliance according to one implementation.

FIG. 1 shows a schematic view of a gas appliance according to one implementation, which in this case corresponds to a gas cooktop 400, but which in other embodiments (shown in FIGS. 15 and 16) corresponds to appliances that consume gas, such as for example gas ovens, gas barbecues, gas heaters, or to systems that distribute gas, such as for example gas distribution lines in a house or general gas distribution lines in a city or town or between cities or towns.

Figure 2:
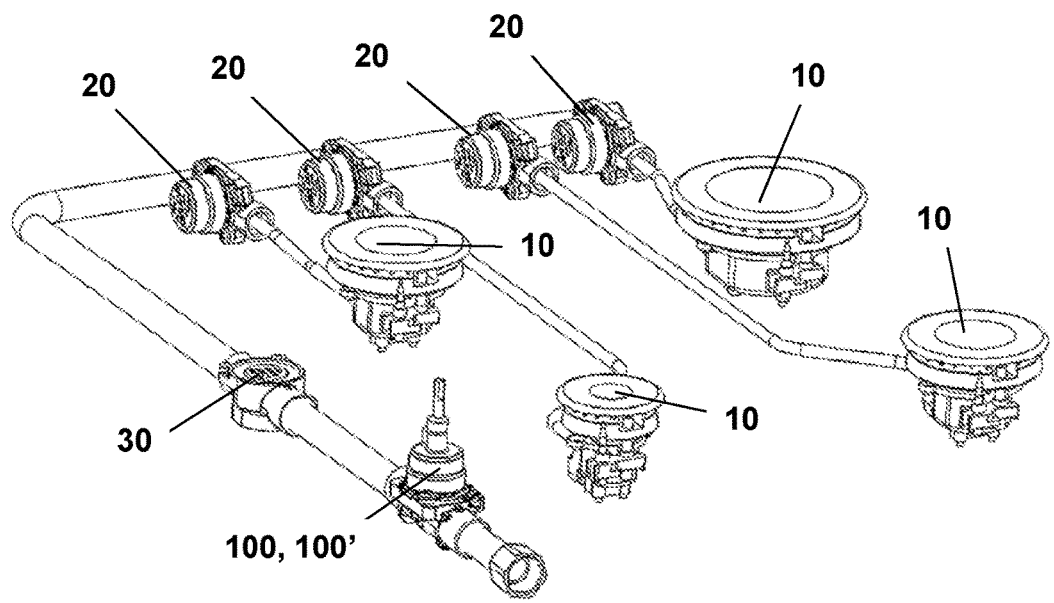
FIG. 2 shows a schematic view of a gas circuit of the gas cooking appliance of FIG. 1 according to one implementation.

FIG. 2 shows a schematic view of some components in a gas circuit of the gas appliance 400 of FIG. 1. wherein the gas appliance 400 comprises four burners 10 where a flame is lit, a main gas inlet through which gas is introduced into the gas appliance 400, four electrically operated regulating valves 20 to regulate gas flow to the burners 10, four outlet ducts communicating the regulating valves 20 with the burners 10, through which the gas flow circulates from the regulating valves 20 to the corresponding burners 10, and an inlet duct communicating the regulating valves 20 with the main gas inlet, through which the gas flow circulates from the main inlet to the regulating valves 20. A safety valve 30 is arranged in this inlet duct in a position prior to the regulating valves 20, and a shut-off valve 100, 100' is arranged between the main gas inlet and the safety valve 30. The safety valve 30 is an electrically operated safety valve that acts when there is a power outage by closing the gas passage.

Figure 3:
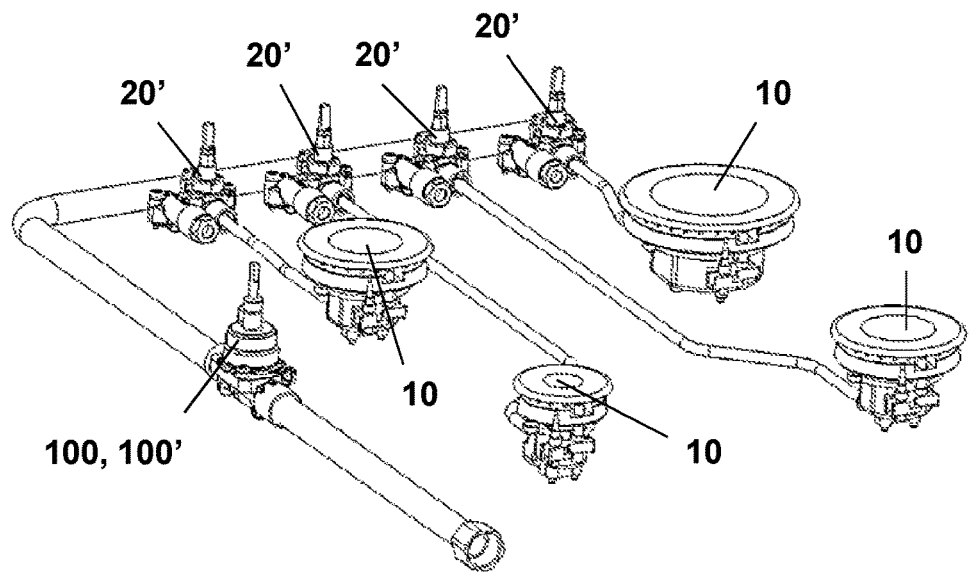
FIG. 3 shows a schematic view of a gas circuit of the gas cooking appliance of FIG. 1 according to another implementation.

FIG. 3 shows a schematic view of some components of in the gas circuit of the gas appliance 400 of FIG. 1 according to another implementation. The gas circuit is much like the gas circuit of FIG. 2, with the difference that the regulating valves 20 have been substituted with gas cocks 20' having flame safety features.

Figure 4:
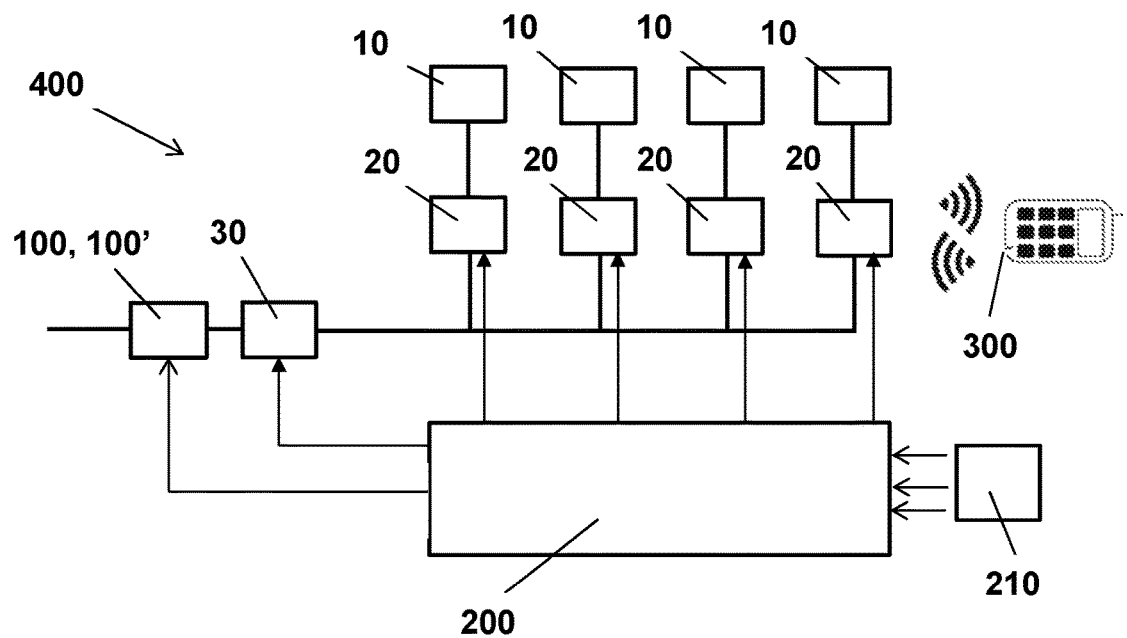
FIG. 4 shows a schematic block depiction of the gas circuit of the gas cooking appliance of FIG. 2.

FIG. 4 shows a schematic block depiction of the gas appliance 400 of FIG. 2. The gas appliance 400 further comprises a control unit 200 electrically operating the regulating valves 20 in this case. The control unit 200 receives instructions that the user enters through a user interface (not depicted in the drawings), and acts on the regulating valves 20 depending on the received instructions to thus regulate gas flow to the corresponding burners 10. The shut-off valve 100, 100' corresponds to a two-position, ON/OFF type valve, such that when it is in the OFF position it prevents the gas passage to the control valves 20 and therefore to the burners 10.

Figure 5:
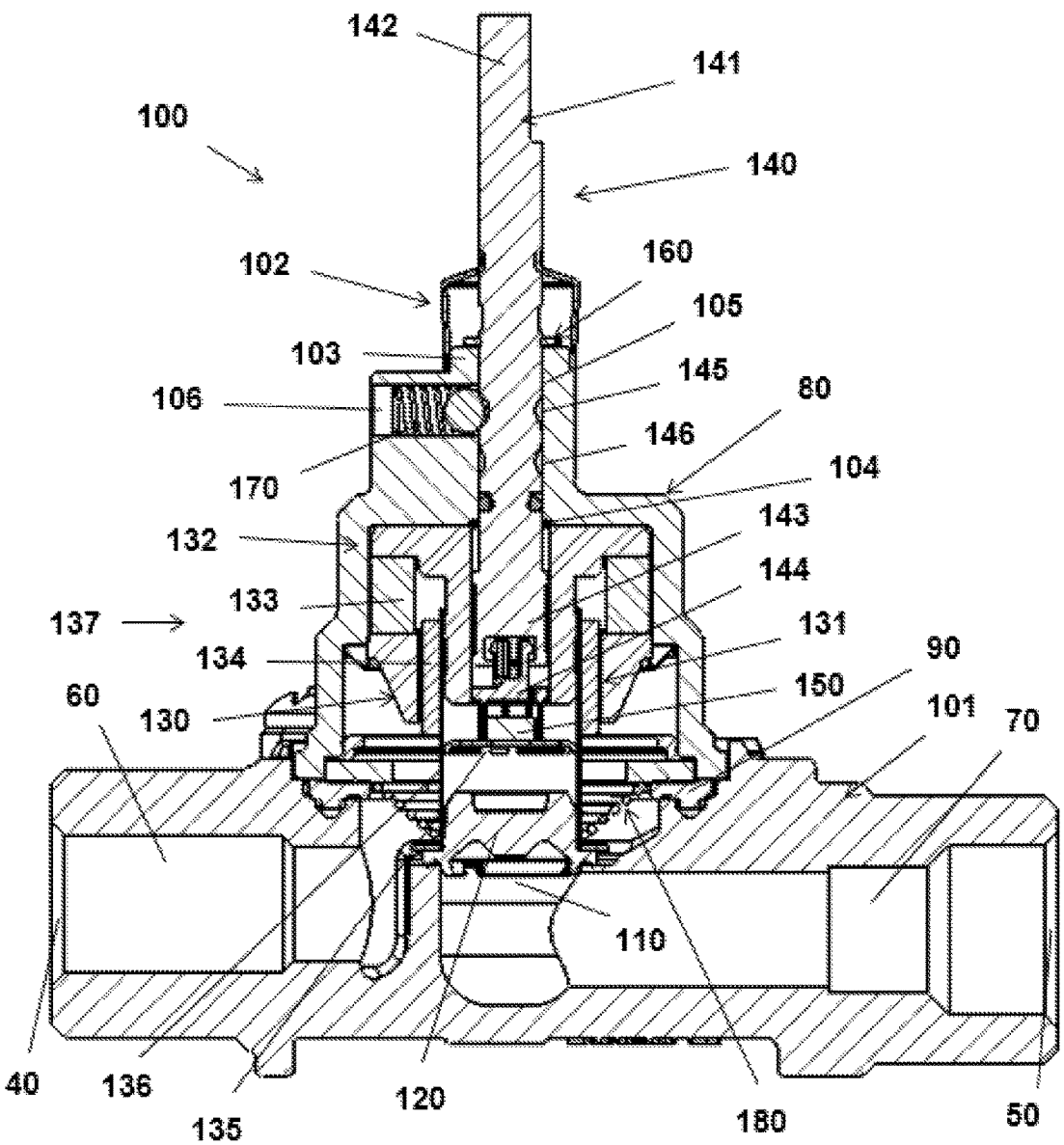
FIG. 5 shows a section view of a shut-off valve used in a gas appliance according to one implementation, the closure member of the shut-off valve being in a closed position and the manual actuator being in a closed position.
Figure 8:
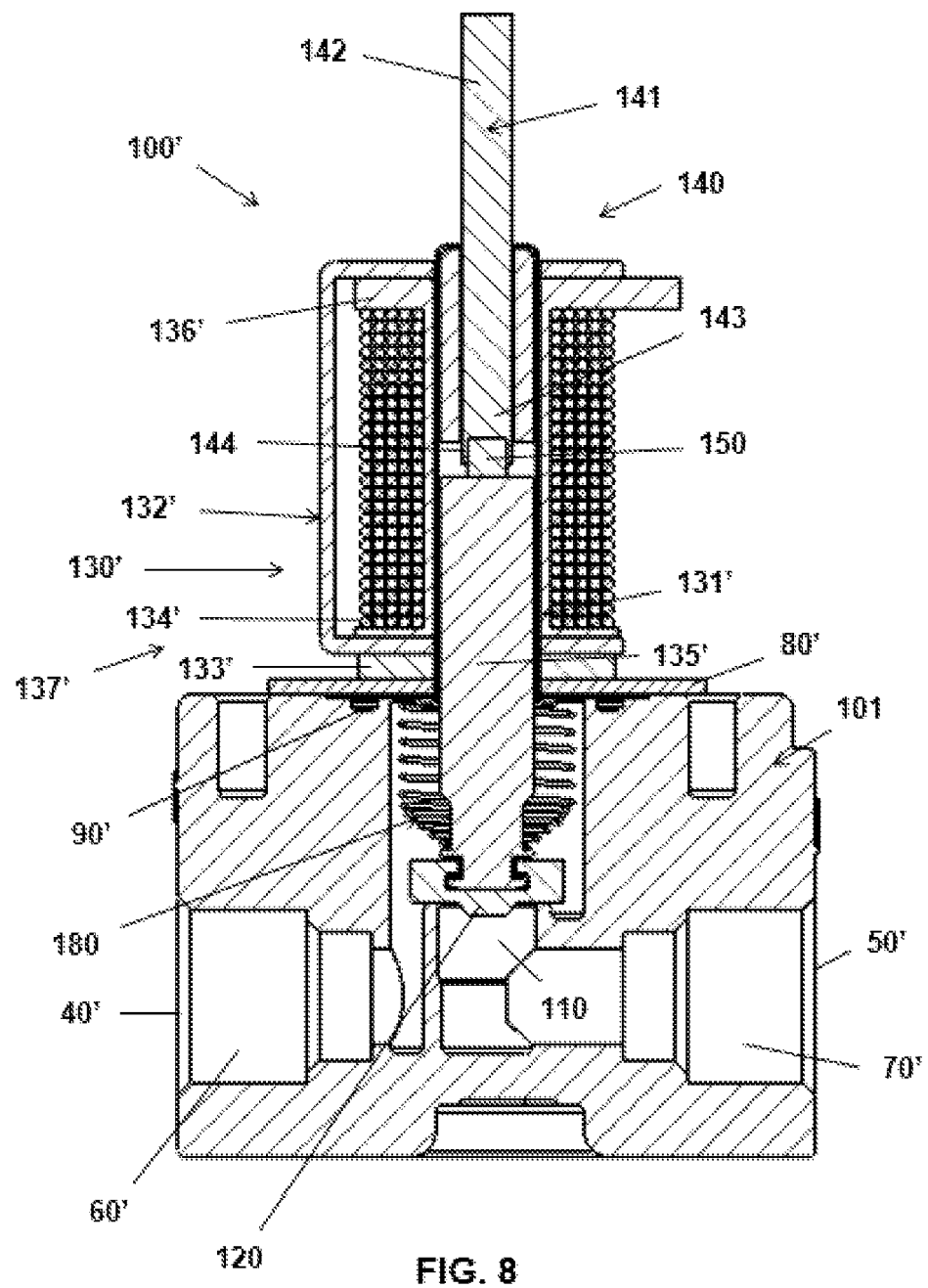
FIG. 8 shows a section view of a shut-off valve used in a gas appliance according to another implementation, the closure member of the shut-off valve being in a closed position and the manual actuator being in a closed position.

FIGS. 5 and 8 show a section view of a first and second implementations, respectively, of shut-off valve 100, 100' that may be used in the gas appliance 400. The shut-off valve 100, 100' comprises a gas inlet 40, 40' through which it receives gas from an external source, a gas outlet 50, 50' through which gas exits the valve 100, 100', a closure orifice 110 through which the outlet 50, 50' is communicated with the inlet 40, 40', and gas from the inlet 40, 40' reaches the outlet 50, 50', a closure member 120 which blocks or closes the closure orifice 110 in a closed position, preventing the gas passage to the outlet 50, 50', and which does not cooperate with the closure orifice 110 in an open position to open the gas passage, and an electromagnetic actuator 130, 130' operated by a control unit 200 acting on the closure member 120 to cause its change in position.

The shut-off valve 100, 100' comprises a body 101 incorporating the inlet 40, 40', the outlet 50, 50', the closure orifice 110, an inlet duct 60, 60' communicating the inlet 40, 40' with the closure orifice 110, and an outlet duct 70, 70' communicating the closure orifice 110 with the outlet 50, 50'. According to some implementations the closure orifice 110 and part of the inlet duct 60, 60' are accessible from outside the body 101, and the valve 100, 100' comprises a casing 80, 80' which is attached to the body 101 and closes access from outside to the part of the inlet duct 60, 60' and to the closure orifice 110, and a sealing member 90, 90' for closing the area of attachment between the body 101 and the casing 80 in a leak-tight manner. In the shut-off valve 100 shown in FIG. 5, the body 101 demarcates a first compartment inside the shut-off valve 100. A second compartment inside the valve 100 where the electromagnetic actuator 130 is housed is demarcated between the body 101 and the casing 80, the second compartment being communicated with the first compartment. In the shut-off valve 100' shown in FIG. 8, the electromagnetic actuator 130' is housed outside the body 101 and casing 80', the second compartment being communicated at all times with the first compartment.

The electromagnetic actuator 130, 130' of the shut-off valve 100, 100' comprises a movable assembly 131, 131' which is attached to the closure member 120, the closure member 120 moving with the movable assembly 131, 131'. The electromagnetic actuator 130, 130' also comprises an electromagnetic field generator/electromagnetic means 137, 137' magnetically associated with the movable assembly 130, 130' which allow causing the change in position of the movable assembly 130, 130' as the electromagnetic field generator is fed with electric pulses that may be of different polarity. The electromagnetic means 137, 137' of the electromagnetic actuator 130, 130' comprise a static armature 132, 132', a static permanent magnet 133, 133', and a coil 134, 134'. The movable assembly 131, 131' is associated with the static armature 132, 132' with freedom of movement, and the coil 134, 134' cooperates with the permanent magnet 133, 133' depending on power supplied to the coil so that the movable assembly 131, 131' moves and thus causes the change in position of the closure member 120.

According to some implementations the shut-off valve 100, 100' comprises a spring 180 which is coupled at a first end to a fixed portion of the shut-off valve 100, 100', and is coupled at a second end to the closure member 120, being compressed or decompressed when the closure member 120 changes position. According to some implementations, such as those shown in FIGS. 5 and 8, the spring 180 biases the closure member 120 toward the closed position.

According to some implementations, In the shut-off valve 100 shown in FIG. 5, the movable assembly 131 comprises a bobbin 136 associated with the static armature 132 with freedom of movement, and the coil 134 is wound on and attached to the bobbin 136, the bobbin 136 being fixed at one end to the closure member 120. According to some implementations the static armature 132 comprises a first member comprising a circular section and a cylindrical section prolonging centrally and in a perpendicular manner from the circular section, and a second annular member. The cylindrical section is at least partially housed in the bobbin 136, the bobbin 136 being associated with the armature 132 by means of the first member. The second member is traversed by the bobbin 136, by the coil 134 wound on and fixed to the bobbin 136 and by the cylindrical section of the first member. The permanent magnet 133 remains held and static between both members of the armature 132. According to some implementations the permanent magnet 133 has an annular shape, and like the second member of the armature 132, it is traversed by the bobbin 136, by the coil 134 wound on and fixed to the bobbin 136 and by the cylindrical section of the first member. According to some implementations the closure member 120 is at least partially press fit in the bobbin 136, being attached to the bobbin 136 in that manner.

In the shut-off valve 100' shown in FIG. 8, the electromagnetic actuator 130' comprises a bobbin 136' associated with the static armature 132' in a static manner, and the coil 134' is wound on and attached to the bobbin 136', the coil 134' and bobbin 136' forming a solenoid which is associated with the armature with freedom of movement, the closure member 120 being fixed at one end to the movable assembly 131, the movable assembly 131' being housed inside the bobbin 136'. According to some implementations the static armature 132' comprises a first member surrounding the assembly formed by the bobbin 136' and the coil 134', and a second member which is the casing 80', the permanent magnet 133' being arranged between the first and second member of the armature 132'.

According to some implementations the shut-off valve 100, 100' corresponds to a bistable shut-off valve, such that the closure member 120 changes position when the coil 134, 134' is powered and maintains its position in the event of absence of power being supplied to the coil 134, 134', a power supply pulse being sufficient to cause the change in position, and the direction of movement of the movable element depending on the polarity of the pulse. The movable assembly 131, 131' of the electromagnetic actuator 130, 130' of the shut-off valve 100, 100' comprises a first ferromagnetic part 135, 135' which allows making the shut-off valve 100, 100' bistable. The first ferromagnetic part 135, 135' is fixed to the movable assembly 131, 131', the first ferromagnetic part 135, 135' adhering to the permanent magnet 133, 133' since it is positioned such that when the coil 134, 134' is powered, the first ferromagnetic part 135, 135' is within the magnetic field resulting from the cooperation between the magnetic fields of the permanent magnet 133, 133' and of the coil 134, 134' itself. Therefore, due to its ferromagnetic properties, when the closure member 120 switches to the open position due to the power supply to the coil 134, 134', the first ferromagnetic part 135, 135' is attracted to the permanent magnet 133, 133', staying that way even in the event of the absence of power supply to the coil 134, 134' (the magnetic field of the permanent magnet 133, 133' is enough to keep it like that by itself). Bistable performance in the valve 100, 100' is therefore achieved.

In the shut-off valve 100 of FIG. 5, the first ferromagnetic part 135 is housed and fixed inside the bobbin 136. According to another implementation (not shown in the drawings), the movable assembly 131 of the valve 100 comprises a first ferromagnetic part 135 which is arranged inside the bobbin 136 and a second ferromagnetic part which is traversed by the bobbin 136, the first ferromagnetic part 135 and the second ferromagnetic part being fixed to the bobbin 136. The first ferromagnetic part 135 preferably corresponds to a disc and the second ferromagnetic part preferably corresponds to an annular part, and they are concentric with respect to a central shaft of the bobbin.

In the shut-off valve 100' of FIG. 8, the movable assembly 131' is a ferromagnetic core formed by the first ferromagnetic part 135', the closure member 120 being fixed at one end of the movable assembly 131', and the movable assembly 131' being housed inside the bobbin 136'.

The first ferromagnetic part 135, 135' (or the two ferromagnetic parts as described above) can comprise an intentionally selected Curie temperature to provide thermal safety. When the Curie temperature is reached in the areas around the first ferromagnetic part 135, 135', the first ferromagnetic part 135, 135' loses its ferromagnetic properties and is no longer attracted to the permanent magnet 133, 133', the spring 180 causing the closure member 120 to return to its closed position even when the coil 134, 134' has not be supplied with a current pulse. The permanent magnet 133' in the shut-off valve 100' can also be a ferromagnetic part with a low Curie temperature. The Curie temperature can be comprised between 50° C. and 130° C., for example, which corresponds to the temperature that can be reached in the area around the valve 100, 100' when it (and/or the apparatus where it is mounted) is working under normal conditions. If this temperature is exceeded, it is interpreted that an anomaly (a fire, for example) has occurred, and the gas passage through the valve 100, 100' is closed to prevent possible further damage. The manner of choosing the Curie temperature could also be different, depending on the area where the use of the shut-off valve 100, 100' is envisaged. The movable permanent magnet 150 and the permanent magnet 133 of the shut-off valve 100 may be made of neodymium or samarium, which withstand high temperatures.

The shut-off valve 100, 100' also comprises a manual actuator 140 for moving the movable assembly 131, 131' together with the closure member 120 for opening or closing the gas flow, the manual actuator 140 comprising an open position in which it is decoupled from the movable assembly 131, 131', the electromagnetic actuator 130, 130' thus being able to act on the movable assembly 131, 131' to cause the closure of the closure member 120. The manual actuator 140 is arranged in the shut-off valve 100, 100' together with the electromagnetic actuator 130, 130', being introduced in the shut-off valve 100, 100' through the casing 80, 80'.

In order for the manual actuator 140 to be able to open the gas passage in addition to closing it, according to some implementations the manual actuator comprises a movable permanent magnet 150, although in other implementations (not shown in the drawings) it could comprise a mechanical coupling element between the manual actuator 140 and the movable assembly 131, 131'. The movable permanent magnet 150 is coupled to the movable assembly 131, 131' and moves with the movable assembly 131, 131' when the manual actuator 140 acts to open the gas passage. When the manual actuator 140 reaches the open position and the closure member 120 opens the gas passage, the movable permanent magnet 150 is decoupled from the movable assembly 131, 131'.

The closure member 120 has a closed position in which it closes the closure orifice 110, and the movable assembly 131, 131' has a first path from the closed position. In the implementation of FIG. 5, this first path is limited by the circular section of the first member of the armature 132, and in the implementation of FIG. 8, it is limited by a stop of the manual actuator 140. At the end of the first path of the movable assembly 131, 131', the first ferromagnetic part 135, 135' magnetically adheres to the permanent magnet 133, 133' and it maintains its position in the event of an absence of power supply to the coil 134, 134', a power supply pulse being sufficient to cause the change in position.

The manual actuator 140 has a second path between the closed position and the open position of the manual actuator 140, this second path being limited by positioning means 160. The movable permanent magnet 150 is magnetically fixed to the first ferromagnetic part 135, 135' during the first path of the movable assembly 131, 131'. The second path has a larger displacement than the first path, such that when the manual actuator 140 reaches the limit position of the first path, the movable permanent magnet 150 is decoupled from the first ferromagnetic part 135, 135' of the movable assembly 131, 131', and the manual actuator 140 continues to move up to the limit of the second path.

Figure 6:
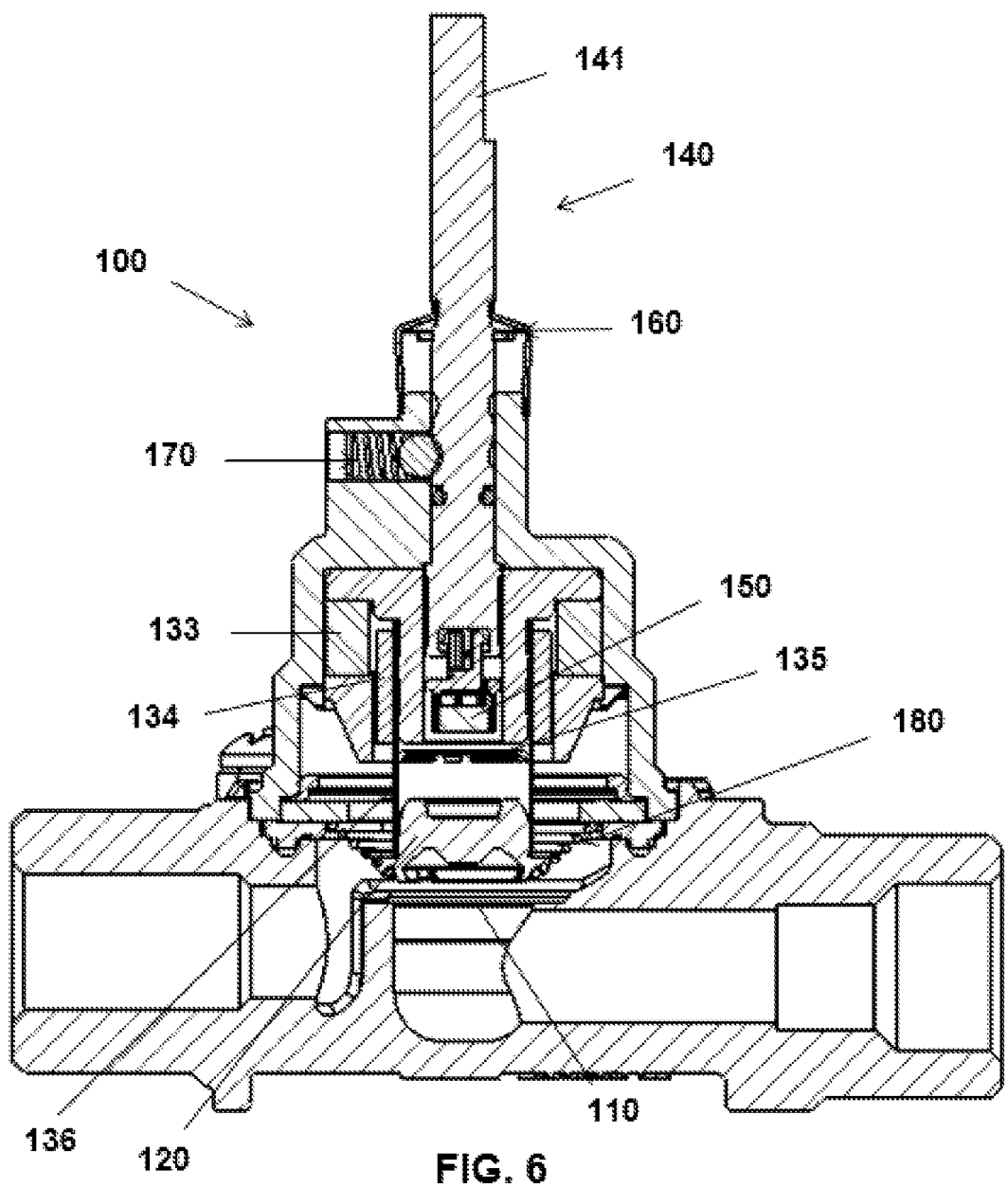
FIG. 6 shows a section view of the shut-off valve of FIG. 5, the shut-off valve being in an open position and the manual actuator being in an open position.
Figure 7:
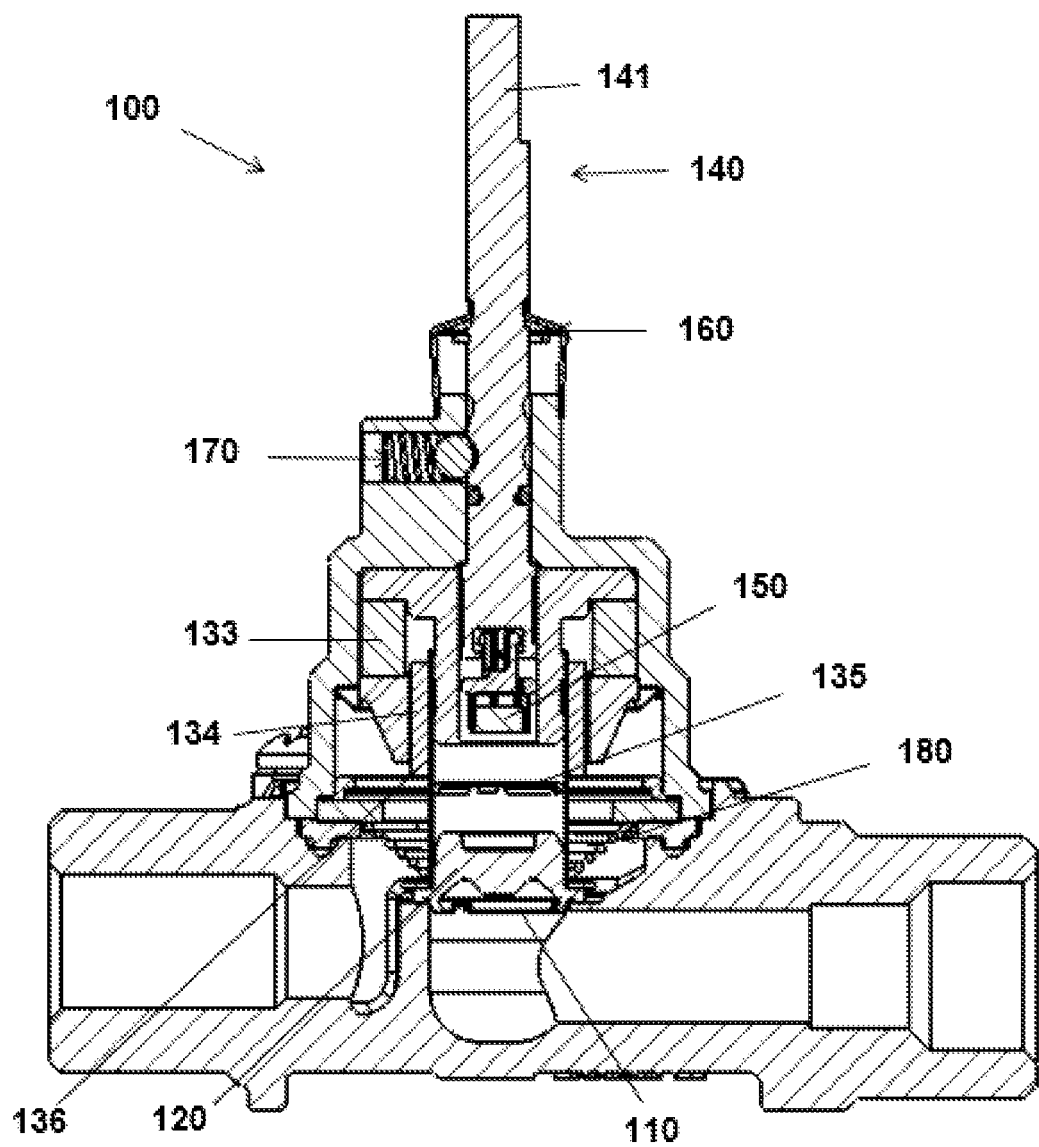
FIG. 7 shows a section view of the shut-off valve of FIG. 5, the closure member of the shut-off valve being in a closed position and the manual actuator being in an open position after an actuation of the electromagnetic actuator.

FIG. 5 shows a section view of the shut-off valve 100, the shut-off valve 100 being closed and the manual actuator 140 being in a closed position. FIG. 6 shows a section view of the shut-off valve 100 of FIG. 5, the shut-off valve 100 being open and the manual actuator 140 being in an open position, and FIG. 7 shows a section view of the shut-off valve 100 of FIG. 5, the shut-off valve 100 being closed and the manual actuator 140 being in an open position, after actuating the electromagnetic actuator 130.

Figure 9:
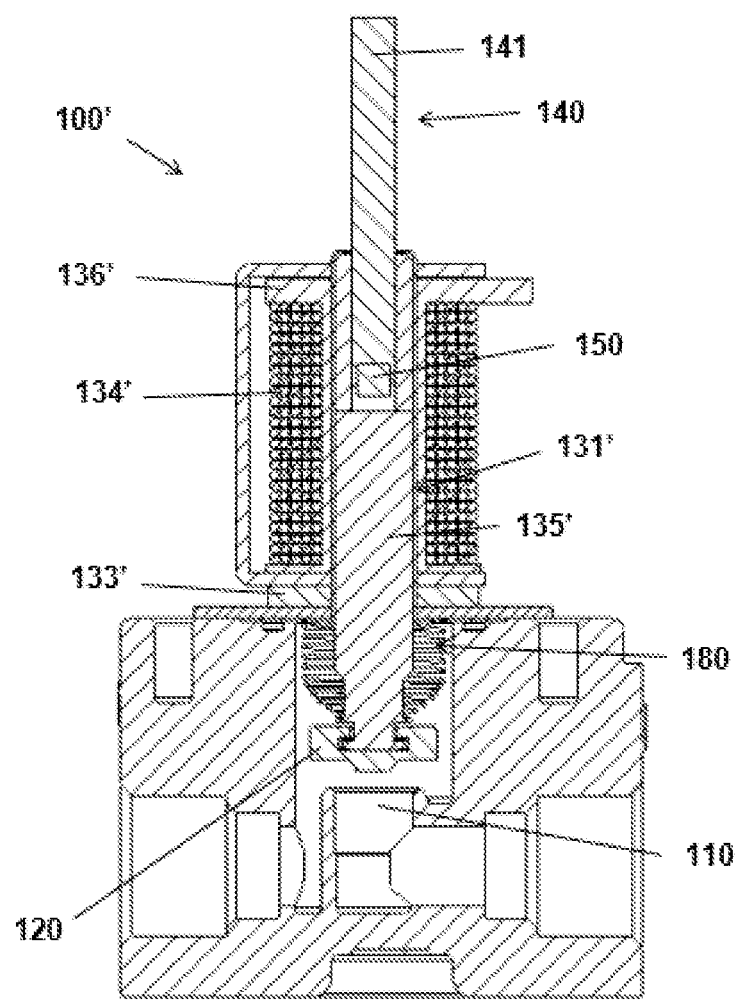
FIG. 9 shows a section view of the shut-off valve of FIG. 8, the closure member of the shut-off valve being in an open position and the manual actuator being in an open position.
Figure 10:
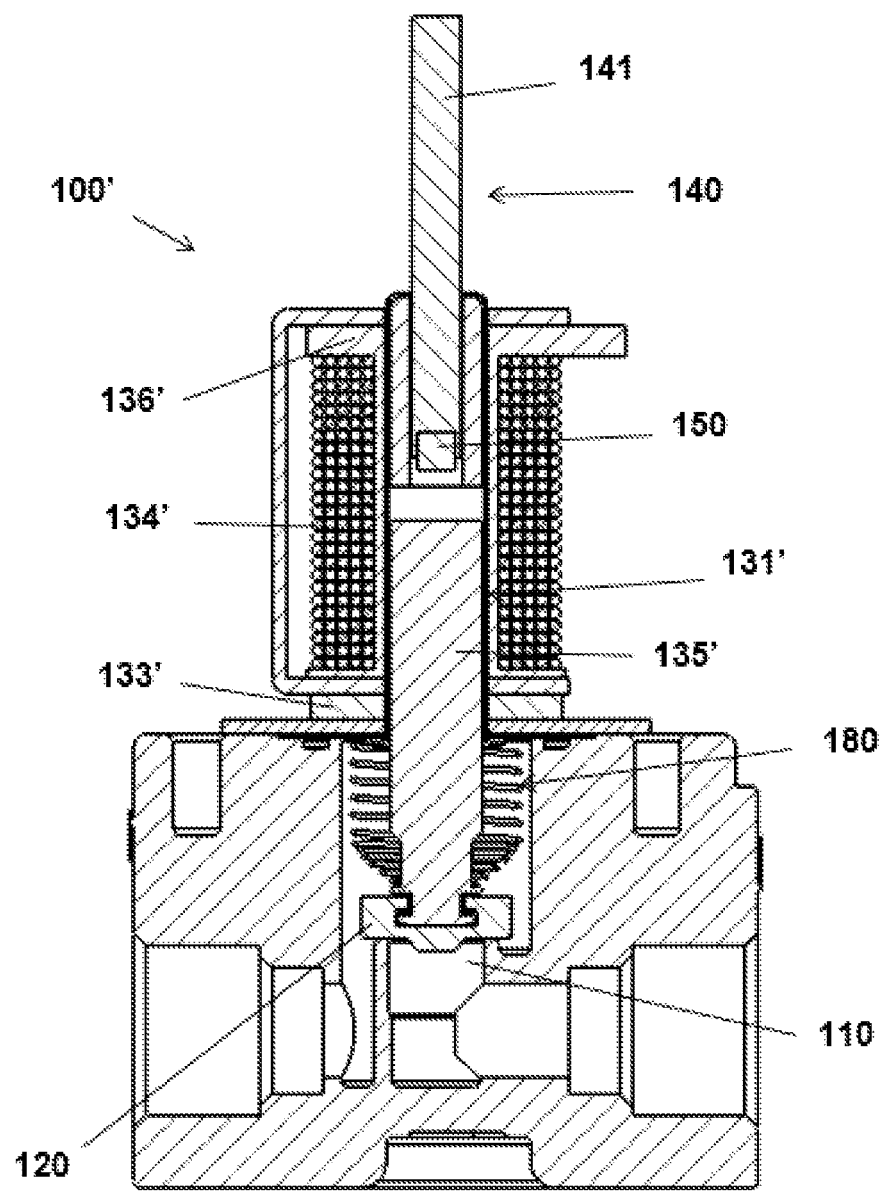
FIG. 10 shows a section view of the shut-off valve of FIG. 8, the closure member of the shut-off valve being in a closed position and the manual actuator being in an open position after actuation of the electromagnetic actuator.

FIG. 8 shows a section view of the solenoid type shut-off valve 100', the shut-off valve 100' being closed and the manual actuator 140 being in a closed position. FIG. 9 shows a section view of the shut-off valve 100' of FIG. 8, the shut-off valve 100' being open and the manual actuator 140 being in an open position, and FIG. 10 shows a section view of the shut-off valve 100' of FIG. 8, the shut-off valve 100' being closed and the manual actuator 140 being in an open position, after actuating the electromagnetic actuator 130'.

The manual actuator 140 comprises a shaft 141 arranged inside the shut-off valve 100, 100', the shaft 141 moving in an axial direction between the closed position and the open position of the manual actuator 140. According to some implementations the shaft 141 is arranged partially inside the bobbin 136, 136' of the shut-off valve 100, 100'. The shaft 141 comprises an outer end 142 accessible from outside the shut-off valve 100, 100' and an inner end 143 opposite the outer end 142, the movable permanent magnet 150 being coupled to the inner end 143 of the shaft 141 on one side and to the first ferromagnetic part 135, 135' on the other side. According to some implementations the shaft 141 of the manual actuator 140 comprises a magnet holder 144 which is coupled to the inner end 143 of the shaft 141, the magnet holder 144 at least partially housing the movable permanent magnet 150. According to such an implementation, the coupling between the magnet holder 144 and the inner end 143 may comprise hooks that are hooked in a housing of the shaft 141 at the inner end 143 thereof, the housing having allowance with respect to the axial dimension of the hooks, such that coupling between the magnet holder 144 and the inner end 143 has play in the axial movement direction of the shaft 141. This allowance prevents the shaft 141 from transmitting force to the closure member 120 when the manual actuator 140 reaches the closed position. Though not shown in the drawings, shut-off valve 100' may comprise the same system for coupling the movable permanent magnet 150 as shut-off valve 100.

According to some implementations the manual actuator 140 comprises positioning means 160 arranged attached to the shaft 141. In such an implementation, the positioning means 160 may be a washer fixed to the shaft 141, but can also be a pin fixed to the shaft 141 or another element projecting from the shaft 141. Although not shown in FIG. 8, similar positioning means may also be incorporated into the valve 100'. In the implementation of FIG. 5 the shaft 141 of the manual actuator 140 resides within a duct 105 arranged in the casing 80 of the shut-off valve 100, the duct being arranged between the first member and the second member of the armature 132. The valves 100, 100' comprise stop means 103 and 104 (not shown for valve 100', but being like that of valve 100) arranged in the path of movement of the shaft 141 with 103 being an end stop and 104 being an initial stop. According to one implementation the valves 100, 100' comprise a hood 102 surrounding the shaft 141 and fixed at one end to the casing 80 of the valve 100 or to the first member of the armature 132 of the valve 100. The positioning means 160 allows positioning the manual actuator 140 in the open position by moving the shaft 141 until the positioning means 160 abut with the initial stop 104, and positioning the manual actuator 140 in the closed position by moving the shaft 141 until the positioning means 160 abut with the end stop 103.

The manual actuator 140 may also comprises locking means 170 arranged around the shaft 141 of the manual actuator 140 and not shown for the shut-off valve 100', even though it may comprise similar locking means as valve 100. The shaft 141 comprises an initial housing 146 and an end housing 145, which according to some implementations comprise perimetral grooves in the shaft 141. The locking means 170 may be a ball, such as a steel ball, and a spring pushing the ball in a radial direction toward the shaft 141 of the manual actuator 140. According to some implementations the locking means 170 is arranged in a fixing duct 106 (not shown for the shut-off valve 100') of the shut-off valve 100, 100'. The fixing duct 106 may be accessible from outside the shut-off valve 100, 100' and is in communication with the inlet duct 105 of the shaft 141. The ball of the locking means 170 is housed in the fixing duct 106 with a spring arranged to pushing the ball in contact with the shaft 141 which is housed in the duct 105.

The locking means 170 allows locking the manual actuator 140 in the open position by moving the shaft 141 until the fixing duct 106 is aligned with the initial housing 146, the ball pushed by the spring of the locking means 170 being housed in the initial housing 146, making movement of the shaft 141 impossible unless it is manually moved to the closed position. The locking means 170 also allows locking the manual actuator 140 in the closed position by moving the shaft 141 until the fixing duct 106 is aligned with the end housing 145, the ball pushed by the spring of the locking means 170 being housed in the end housing 145, making movement of the shaft 141 impossible unless it is manually moved to the open position. Therefore, when the manual actuator 140 is in the open position, the shaft 141 is decoupled from the movable assembly 131, 131' and an electrical pulse can be sent electrically to the electromagnetic actuator 130 so that the electromagnetic actuator 130, 130' acts on the movable assembly 131, 131' to cause the closure member 120 to move from the open position to the closed position, the force generated by the electromagnetic actuator 130, 130' on the movable assembly 131, 131' overcomes the force for keeping the first ferromagnetic part 135, 135' in place due to the permanent magnet 133, 133'. When the manual actuator 140 is in the closed position, even if though electric pulses are sent to the electromagnetic actuator 130, 130', the electromagnetic actuator 130, 130' does not generate sufficient force in the movable assembly 131, 131' to overcome the force of the spring 180 and the locking force of the locking means 107 in order to switch the closure member 120 to the open position. According to some implementations the permanent magnet 133, 133' and the movable permanent magnet 150 are arranged so a repulsive force exist between them when the shut-off closure member 120 is in the closed position, thereby assisting in maintaining the closure member in the closed position.

Figure 11:
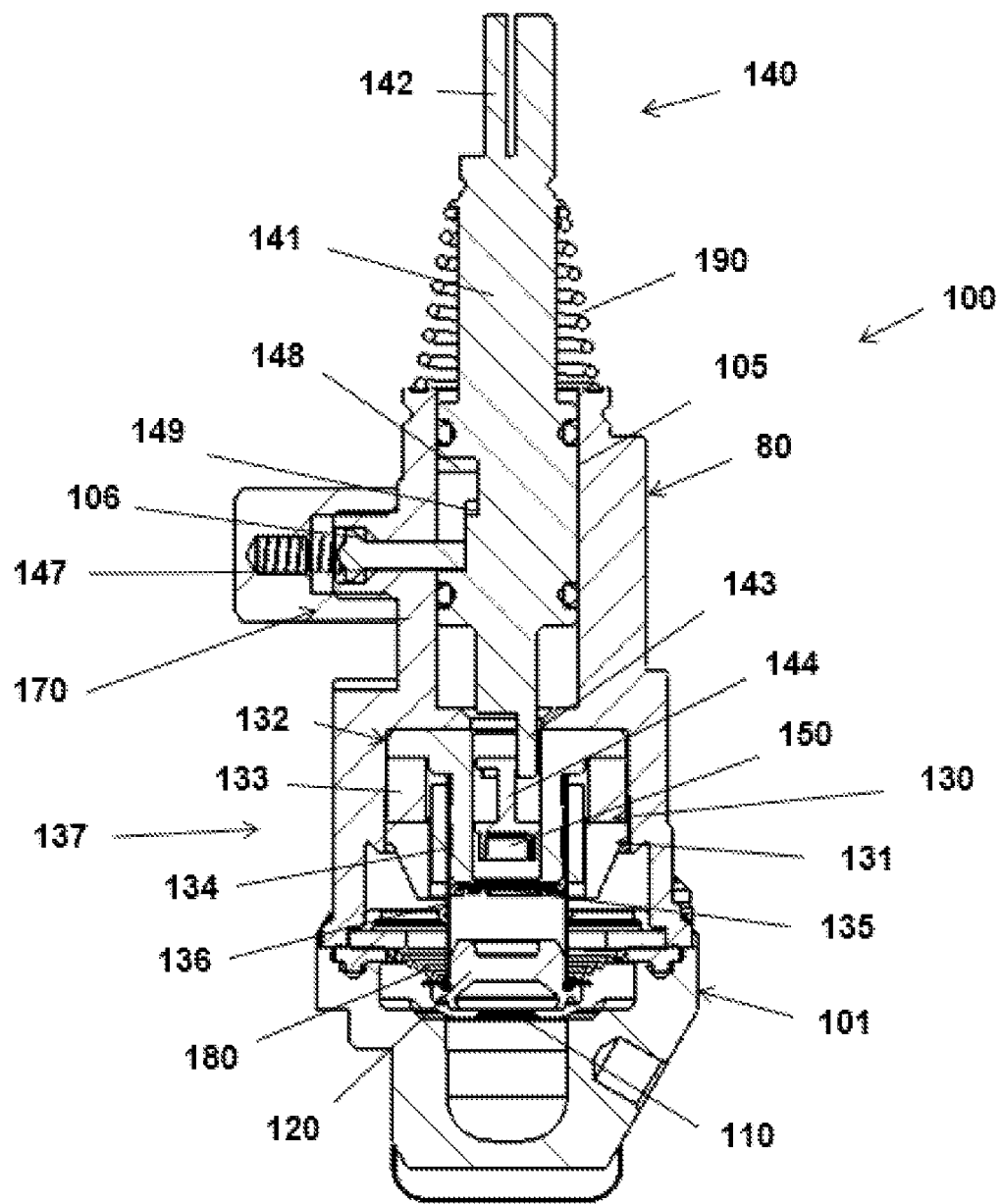
FIG. 11 shows a section view of a shut-off valve according to another implementation, the closure member of the shut-off valve being in an open position and the manual actuator being in an open position.
Figure 12:
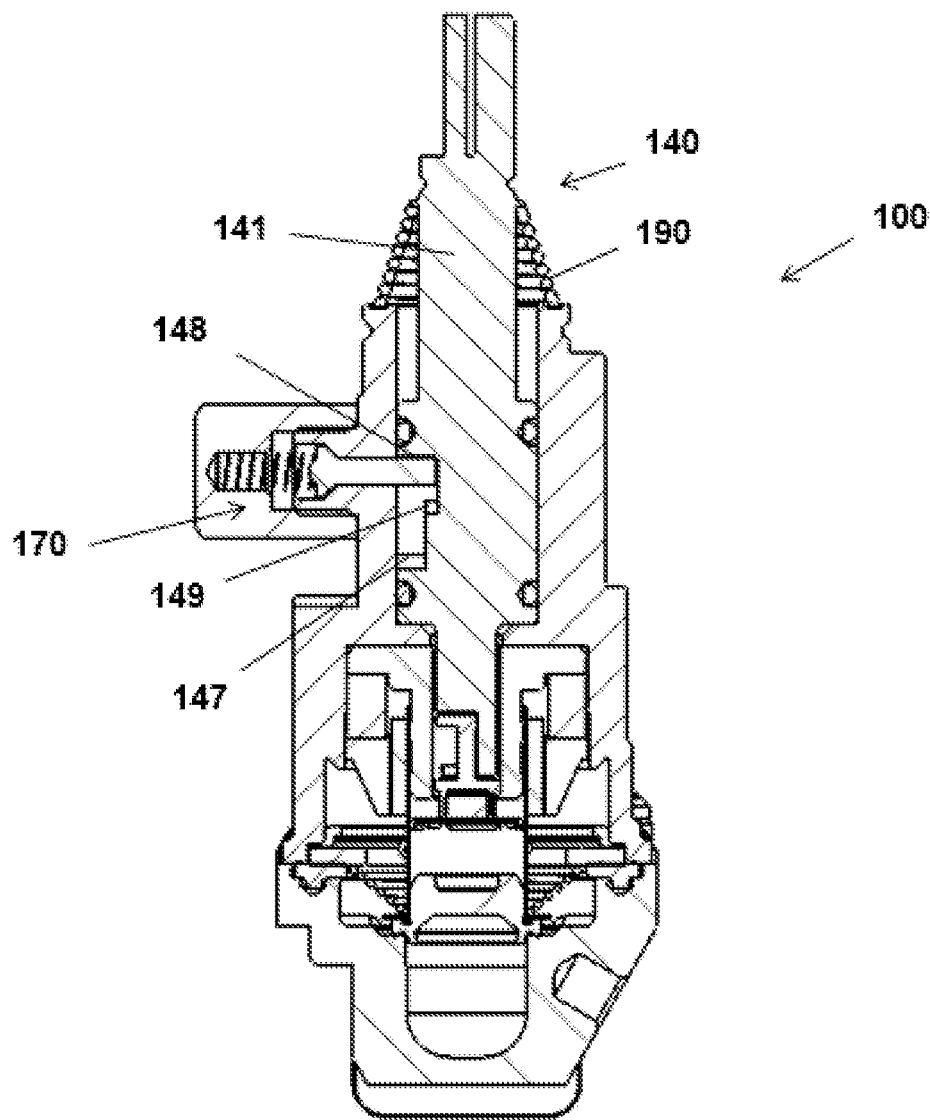
FIG. 12 shows a section view of the shut-off valve of FIG. 11, the closure member of the shut-off valve being in the closed and the manual actuator being in a first closed position.
Figure 13:
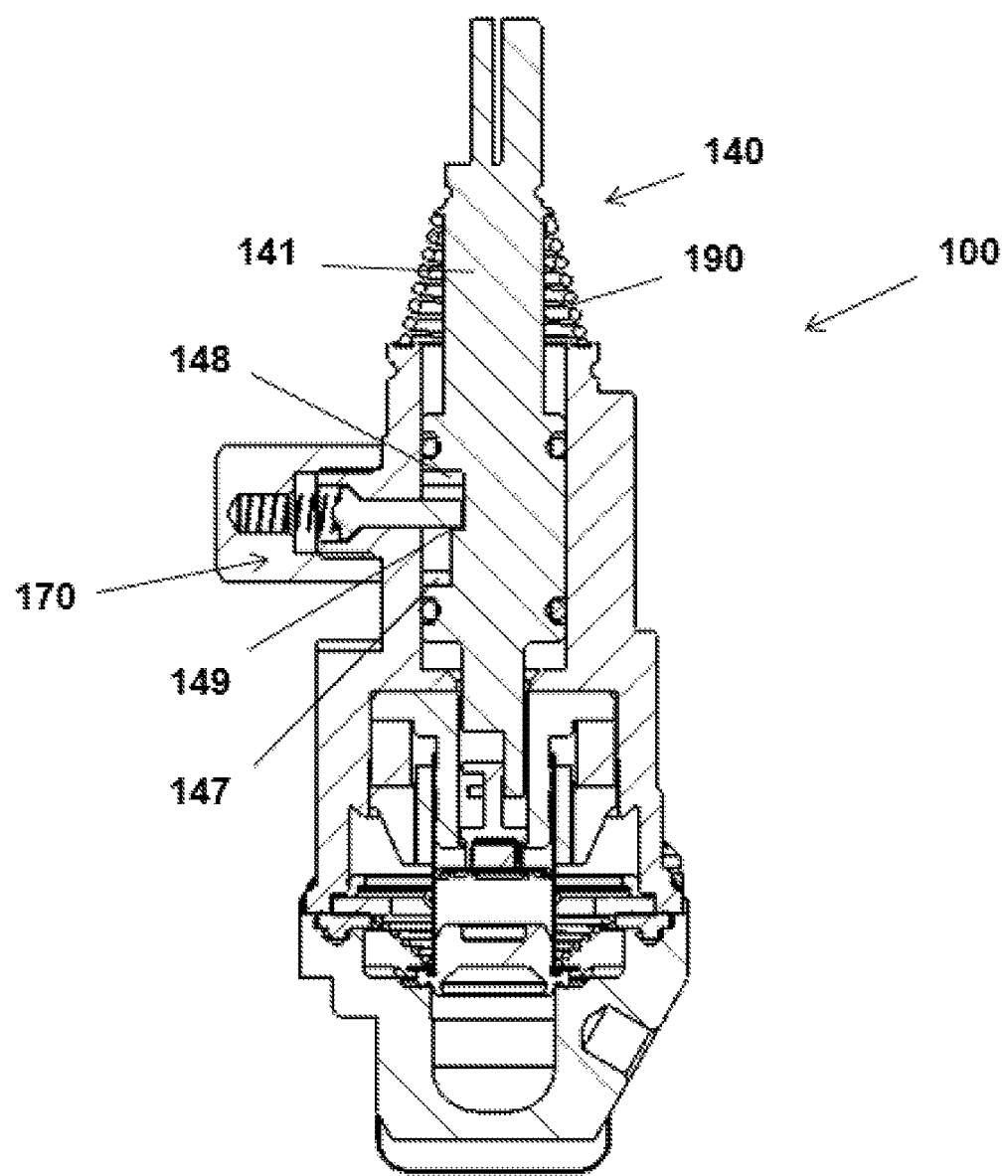
FIG. 13 shows a section view of the shut-off valve of FIG. 11, the closure member of the shut-off valve being in a closed position and the manual actuator being in a second closed position.
Figure 14:
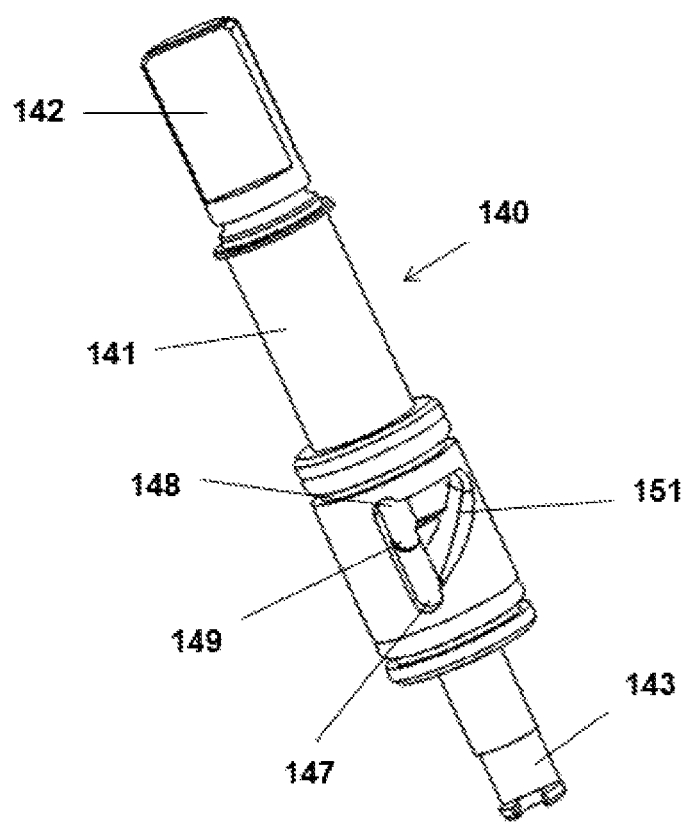
FIG. 14 shows a perspective view of a shaft of a manual actuator of the shut-off valve according to one implementation.

FIG. 11 shows a section view of a variation to the shut-off valve 100 shown in FIG. 5 with each of the closure member 120 and manual actuator 140 being in an open position. FIG. 12 shows a section view of the shut-off valve 100 of FIG. 11 with the closure member 102 being in a closed position and the manual actuator 140 being in a first closed position. FIG. 13 shows a section view of the shut-off valve 100 of FIG. 11 with the closure member 102 being in a closed position and the manual actuator 140 being in a second closed position. FIG. 14 shows a perspective view of a shaft 141 of the manual actuator 140 of the shut-off valve 100 of FIG. 11 according to one implementation.

Each of the shut-off valves 100, 100' shown in FIGS. 5 through 10 are a push-pull valve, wherein the manual actuator 140 is pushed to close the valve and is pulled to open the valve. In the implementations of FIGS. 11 through 14 the shut-off valve 100 is a push-push and rotate valve, wherein the manual actuator is pushed to close the valve and is pushed and rotated to open the valve.

According to some implementations the shut-off valve 100 comprises the inlet duct 105 of the shaft 141 arranged in the casing 80 and a spring 190 axially housed on the surface of shaft 141 of the manual actuator 140, and is supported on an end of the casing 80, the spring 190 therefore urging the shaft 141 in a direction external to the valve. The manual actuator 140 may also comprise the locking means 170 arranged around the shaft 141 of the manual actuator 140 as previously described. The shaft 141 comprises a housing that includes an opening stop 147 and an ending stop 148 displaced axially relative to one another. Between the opening stop 147 and the ending stop 148 there is an intermediate stop 149. The housing further comprises a duct 151 that communicates the opening stop 147 and an ending stop 148. Though not shown in the drawings, shut-off valve 100' may comprise the same system.

The locking means 170 in this implementation may be a pin that is urged in a radial direction toward the shaft 142 by a spring pushing on the pin. The locking means 170 may be arranged in a fixing duct 106 (not shown for the shut-off valve 100') of the shut-off valve 100. The fixing duct 106 is in communication with the inlet duct 105 of the shaft 141 with the pin and spring of the locking means 170 housed therein, the spring acting on the pin to it in contact with the surface of the shaft 141 which is housed in the duct 105.

The locking means 170 allows locking the manual actuator 140 in the closed position by moving the shaft 141 until the pin is stopped by the ending housing 148, the pin pushed by the spring of the locking means 170 being housed in the ending housing 148, making movement of the shaft 141 impossible unless it is manually moved to the open position. When the manual actuator 140 stops pushing, the spring 190 pushes the shaft 141 and the pin passes from the ending housing 148 to the intermediate stop 149.

To open the shut-off valve 100, the manual actuator 140 is pushed again passing the pin from the intermediate stop 149 to the ending housing 148, and at the same time the manual actuator 140 is rotated about its axis, so the pin is introduced in the duct 151, returning the pin to the opening housing 147 due to the bias of spring 190. The pin is stopped by the opening housing 147, and the locking means 170 allows locking the manual actuator 140 in the open position by moving the shaft 141 until the pin is stopped by the opening housing 147, making movement of the shaft 141 impossible unless it is manually moved to the closed position. Therefore, when the manual actuator 140 is in the open position the shaft 141 is decoupled from the movable assembly 131, 131' and an electrical pulse/current can be sent electrically so that the electromagnetic actuator 130, 130' acts on the movable assembly 131, 131' and the closure member 120 changes to the closed position, because the force generated by the electromagnetic actuator 130, 130' on the movable assembly 131, 131' overcomes the force for keeping the first ferromagnetic part 135, 135' in place due to the permanent magnet 133, 133'. When the manual actuator 140 is in the closed position, even though electric pulses are sent to the electromagnetic actuator 130, 130', the electromagnetic actuator 130, 130' does not generate sufficient force in the movable assembly 131, 131' to overcome the force of the spring 180 and the locking force of the locking means 170 in the closed position of the manual actuator 140, such that the closure member 120 cannot switch to the open position. According to some implementations the permanent magnet 133, 133' and the movable permanent magnet 150 are arranged, so a repulsive force exists between them when the shut-off closure member 120 is in the closed position, thereby assisting in maintaining the closure member in the closed position.

Figure 15:
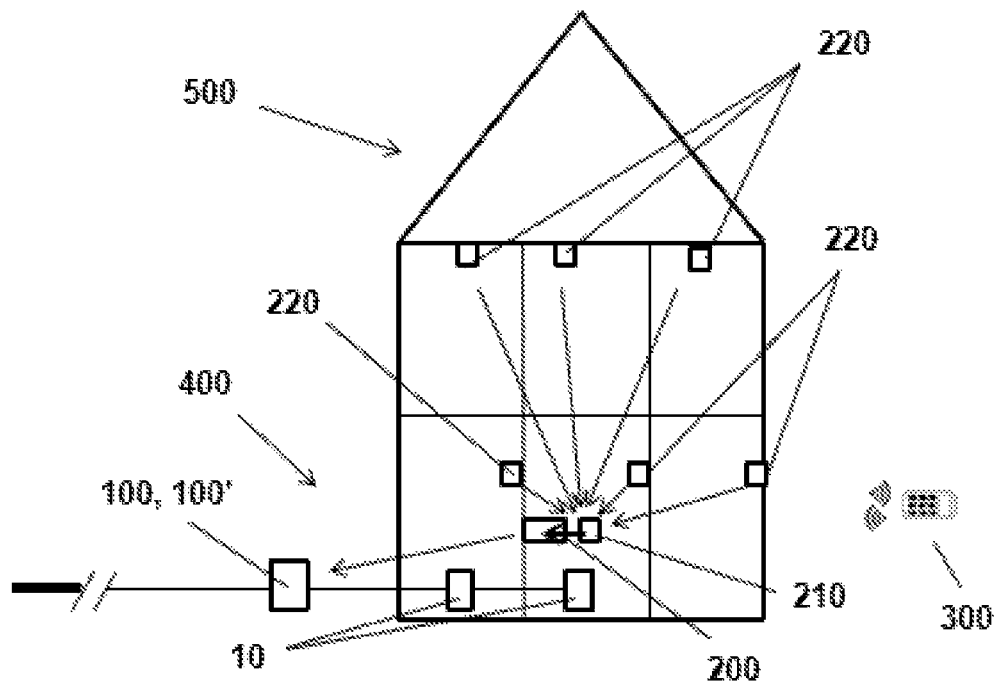
FIG. 15 shows a schematic view of a system according to one implementation.
Figure 16:
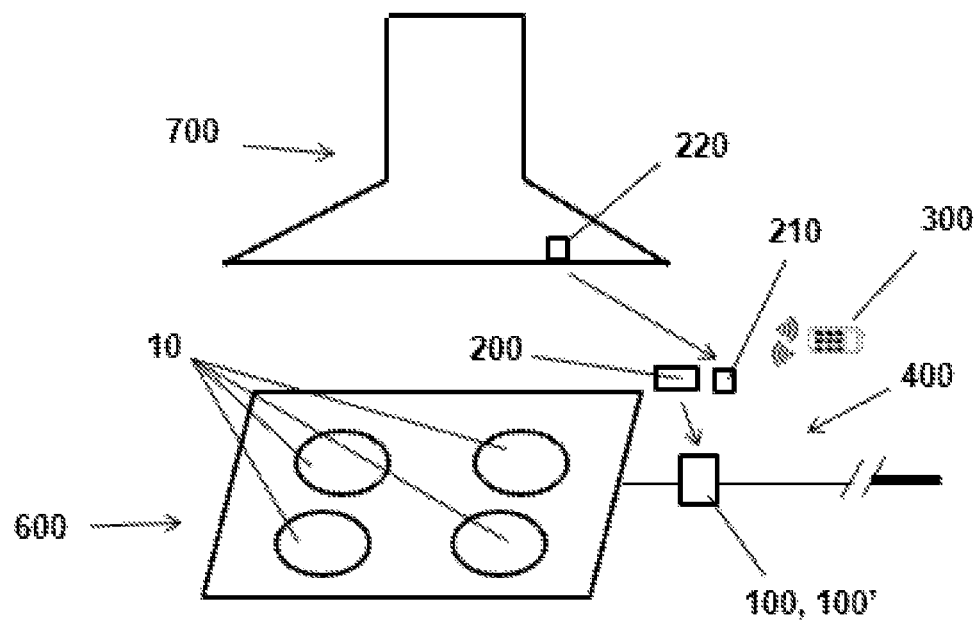
FIG. 16 shows a schematic view of a system according to one implementation.

FIG. 15 shows a schematic view of a gas appliance 400 that corresponds to a gas distribution line in a house 500. FIG. 16 shows a schematic view of a gas appliance according that corresponds to a gas cooktop 600 with a hood 700.

When the manual actuator 140 is in the open position the user can manually control the operation of the gas appliance 400, sending orders to the control unit 200 by means of an interface (not shown in the drawings), or the user remotely controls and monitors the operation of the gas appliance 400 by means of a remote control unit 300, such as a smart phone, tablet, etc. Control of the gas appliance 400 can also be done remotely by means of an external sensor receiver unit 210, which can have a wired or wireless connection. Both the remote control unit 300 and the external sensor receiver unit 210 may be connected to the control unit 200. The external sensor receiver unit 210 can incorporate sensors 220 that are responsive to, for example, a pre-heat time or an operating time of gas burners after cooking, or they can be cooking time sensors or smoke alarm sensors, gas leakage sensors, etc., which directly send signals to the control unit 200 or send signals through the remote control unit 300. The signals in the control unit 200 are converted into electric pulses that when sent to the shut-off valve cause a closing of the closure member 102 when the manual actuator 140 is in the open position and decoupled from the movable assembly 131, 131'.

Thus, in the house/building 500 shown in the FIG. 15 the gas appliance 400 corresponds to a gas distribution line that comes from outside, and is connected to the shut-off valve 100, 100'. In the house 500 the gas line is distributed to several rooms, in each of which there may be different gas burners 10. In the different rooms of the house 500 there are sensors 220. These sensors 220 can be fire, smoke, carbon dioxide, earthquake, gas leakage, etc., said sensors sending wired or wireless signals to the external sensor receiver unit 210, or to the remote control unit 300. One or both of the external sensor receiver unit 210 and remote control unit 300 may then send corresponding signals to the control unit 200. The control unit 200 may then convert the received signals into electric pulses causing the closure of the shut-off valve 100, 100'.

In the gas cooktop 600 and the hood 700 shown in the FIG. 16 the gas appliance 400 corresponds to a gas distribution line that comes from outside and is connected to the shut-off valve 100, 100'. In the gas cooktop 600 the gas line is distributed to several gas burners 10. In a hood 700 locked above the cooktop 600 is arranged a sensor 220. The sensor 220 may be, for example, a fire detector or a gas leakage sensor that sends a signal to the external sensor receiver unit 210, or to the remote control unit 300. One or both of the external sensor receiver unit 210 and remote control unit 300 may then send corresponding signals to the control unit 200. The control unit 200 may then convert the received signals into electric pulses to cause the closure of the shut-off valve 100, 100'.

According to some implementations the control unit 200 comprises at least one emitter and one receiver for emitting/receiving instructions with the remote control unit 300, an instruction processor linked to the emitter and to the receiver and comprising at least one timer and memorized computer applications, the external sensor receiver unit 210, a unit for the connection to an external power source, a rechargeable battery, a user interface, and a display screen being linked to the processor. According to some implementations the remote control unit 300 comprises at least one emitter and one receiver for emitting/receiving instructions with the control unit 200, an instruction processor linked to the emitter and to the receiver and comprising at least one timer and memorized computer applications, a rechargeable battery, a user interface, and a display screen being linked to the processor.

What is claimed is:

1. A shut-off valve comprising:
    an inlet conduit and an outlet conduit,
    a closure orifice disposed between the inlet conduit and the outlet conduit,
    a closure member movable between an open position and a closed position, in the open position the closure member is positioned away from the closure orifice to permit fluid communication between the inlet and outlet conduits, in the closed position the closure member interfaces with the closure orifice to prevent fluid communication between the inlet and outlet conduits,
    an electromagnetic actuator assembly comprising an electromagnetic field generator and a movable assembly to which the closure member is attached, the movable assembly being magnetically associated with the electromagnetic field generator and movable between first and second positions that respectively correspond to the closed and open positions of the closure member, and
    a manual actuator capable of being coupled to and subsequently decoupled from the movable assembly, the manual actuator movable between a first axial position and a second axial position, in the first axial position the manual actuator is coupled with the movable assembly in a manner that causes the movable assembly to move from the first position to the second position when the manual actuator is moved from the first axial position toward the second axial position,
    wherein when in the second axial position the manual actuator is not coupled to the movable assembly and the movable assembly is configured to be moved between the first and second positions upon the electromagnetic field generator producing an electromagnetic field.

2. A shut-off valve according to claim 1, wherein the shut-off valve is transitional between a first, a second and a third configuration, in the first configuration the manual actuator being in the second axial position and decoupled from the movable assembly with the closure member being in the open position, in the second configuration the manual actuator being in the second axial position and decoupled from the movable assembly with the closure member being in the closed position, and in the third position the manual actuator being in the first axial position and coupled with the movable assembly with the closure member also being in the closed position.

3. A shut-off valve according to claim 2, wherein the manual actuator travels a first path when the manual actuator is moved from the second axial position to the first axial position, and travels a second path different from the first path when the manual actuator is moved from the first axial position to the second axial position.

4. A shut-off valve according to claim 3, wherein the second path involves a rotational movement of the manual actuator.

5. A shut-off valve according to claim 4, wherein the first path does not involves a rotational movement of the manual actuator.

6. A shut-off valve according to claim 1, wherein the electromagnetic field generator is capable of producing a first electromagnetic field having a first polarity and a second electromagnetic field having a second polarity, the movable assembly configured to be moved from the first position to the second position upon the electromagnetic field generator producing the first electromagnetic field, the movable assembly configured to be moved from the second position to the first position upon the electromagnetic field generator producing the second electromagnetic field.

7. A shut-off valve according to claim 1, wherein the movable assembly includes a ferromagnetic part that is influenced by the electromagnetic field to cause the movable assembly to be moved between the first and second positions.

8. A shut-off valve according to claim 7, wherein the electromagnetic actuator assembly comprises a permanent magnet that is magnetically associated with the ferromagnetic part when the movable assembly is in the second position, the permanent magnet configured to maintain the movable assembly in the second position when the manual actuator is decoupled from the movable assembly.

9. A shut-off valve according to claim 1, wherein the manual actuator includes a permanent magnet that acts to releasably couple the manual actuator to the movable assembly.

10. A shut-off valve according to claim 9, wherein when the manual actuator is in the first axial position the permanent magnet releasably couples the manual actuator to the movable assembly so that the movable assembly may be moved from the first position to the second position upon the manual actuator being moved from the first axial position toward the second axial position.

11. A shut-off valve according to claim 10, wherein when the movable assembly is in the second position the permanent magnet is decoupled from the movable assembly.

12. A shut-off valve according to claim 1, wherein each of the movable assembly and manual actuator are configured to travel in an axial direction, the first and second positions of the movable assembly delimiting a first axial travel path of the movable assembly, the first axial position and second axial position of the manual actuator delimiting a second axial travel path of the manual actuator, the second axial travel path being longer than the first axial travel path.

13. A shut-off valve according to claim 12, wherein the manual actuator comprises a shaft having a first end and an opposite second end, the first end being accessible from outside the shut-off valve, the second end capable of being coupled to and subsequently decoupled from the movable assembly.

14. A shut-off valve according to claim 13, wherein a permanent magnet is coupled to the second end of the shaft and acts to releasably couple the manual actuator to the movable assembly.

15. A shut-off valve according to claim 14, wherein the permanent magnet is at least partially disposed within a holder formed within or otherwise attached to the second end of the shaft, the permanent magnet having a freedom of movement in the axial movement direction of the manual actuator.

16. A shut-off valve according to claim 15, wherein when the manual actuator is in the first axial position, the second end of the shaft is prevented from transmitting a force to the movable assembly.

17. A shut-off valve according to claim 1, wherein the manual actuator comprises an axial shaft having a radially protruding member that is configured to engage with axially displaced first and second stops to delimit an axial movement of the manual actuator.

18. A shut-off valve according to claim 1, wherein the manual actuator comprises a shaft with a longitudinal axis and having first and second ends, the first end accessible from outside the shut-off valve, the second end capable of being coupled with and subsequently decoupled from the movable assembly, the shaft including a first receptacle at a first location along the longitudinal axis and a second receptacle at a second location along the longitudinal axis, the first receptacle being located nearer the first end of the shaft than the second receptacle, the shut-off valve further comprising a locking member that is resiliently urged in a radial direction with respect to the longitudinal axis of the shaft, the locking member configured to be received into the first and second receptacles to releasably lock the manual actuator respectively in the first and second axial positions.

19. A shut-off valve according to claim 1, wherein the electromagnetic field generator comprises a static armature and a coil, the electromagnetic field generator being configured to produce the electromagnetic field upon power being supplied to the coil.

20. A shut-off valve according to claim 19, wherein the coil is physically coupled to and moves with the movable assembly.

21. A shut-off valve according to claim 8, wherein the ferromagnetic part has a Curie temperature between 50° C. and 130° C.

22. A shut-off valve according to claim 19, wherein the movable assembly includes a ferromagnetic part that is influenced by the electromagnetic field to cause the movable assembly to be moved between the first and second positions, the movable assembly comprising a bobbin that is configured to move inside the static armature, the coil being wound on the bobbin and at least a portion of the ferromagnetic part being housed inside the bobbin, the closure member being fixed to an end of the bobbin.

23. A shut-off valve according to claim 22, wherein at least a portion of the manual actuator is housed inside the bobbin.

24. A shut-off valve according to claim 19, wherein the electromagnetic actuator assembly comprises a bobbin that is fixed with respect to the static armature, the coil being wound on the bobbin and forming with the bobbin a part of a solenoid, the movable assembly including a ferromagnetic part that is at least partially housed inside the bobbin to form a ferromagnetic core of the solenoid.

25. A shut-off valve according to claim 24, wherein at least a portion of the manual actuator is located inside the bobbin.

26. A shut-off valve according to claim 1, wherein the manual actuator comprises a shaft with a longitudinal axis and having first and second ends, the first end accessible from outside the shut-off valve, the second end capable of being coupled with and subsequently decoupled from the movable assembly, the shaft being continuously urged by a resilient member in an axial direction toward the second axial position, the shaft including a housing that possesses an opening stop, an ending stop and an intermediate stop located between the opening and ending stops, the shut-off valve further comprising a locking member that is resiliently urged in a radial direction with respect to the longitudinal axis of the shaft, the locking member configured to engage with each of the opening, ending and intermediate stops, each of the ending stop and intermediate stop corresponding to the first axial position of the manual actuator, the opening stop corresponding to the second axial position of the manual actuator, when the manual actuator is in the second axial position the locking member resides at the opening stop and the manual actuator is capable of being pushed against the urging of the resilient member so that the locking member travels along the shaft to the ending stop, whereupon when a pushing force is removed the shaft is moved by the urging of the resilient member until the locking member resides at the intermediate stop.

27. A shut-off valve according to claim 26, wherein when the locking member resides at the intermediate stop the manual actuator may only be returned to the second axial position by a pushing and also a rotation of the shaft wherein which the locking member travels along a first path from the intermediate stop to the ending stop and then subsequently along a second path from the ending stop to the opening stop.

28. A system comprising:
a shut-off valve comprising:
a closure member movable between an open position and a closed position,
an electromagnetic actuator assembly comprising an electromagnetic field generator and a movable assembly to which the closure member is attached, the movable assembly being magnetically associated with the electromagnetic field generator and movable between first and second positions that respectively correspond to the closed and open positions of the closure member, and
a manual actuator capable of being coupled to and subsequently decoupled from the movable assembly, the manual actuator movable between a first axial position and a second axial position, in the first axial position the manual actuator is coupled with the movable assembly in a manner that causes the movable assembly to move from the first position to the second position as the manual actuator is moved from the first axial position toward the second axial position,
wherein when in the second axial position the manual actuator is not coupled to the movable assembly and the movable assembly is configured to be moved from the second position to the first position upon the electromagnetic field generator receiving an electrical pulse to produce an electromagnetic field;
a sensor that is configured to produce a wired or wireless signal; and
a controller electrically coupled to an electrical power source, the controller configured to receive the wired or wireless signal from the sensor and in response to the wired or wireless signal to generate and send the electric pulse to the electromagnet field generator of the shut-off valve.

29. A system according to claim 28, wherein the sensor is a smoke detector.

30. A system according to claim 28, wherein the sensor is a carbon dioxide sensor.

31. A system according to claim 28, wherein the sensor is an earthquake sensor.

32. A system according to claim 28, wherein the sensor is a timer.

33. A system according to claim 28, wherein the sensor is a temperature sensor.

34. A system according to claim 28, wherein the sensor is a gas leakage sensor.

35. A system according to claim 28, further comprising a remote control unit that is configured to send a signal to the controller to cause the controller to generate and send the electric pulse to the electromagnet actuator assembly of the shut-off valve.

36. A system according to claim 35, wherein the remote control unit is a smart phone or a tablet.

37. A system comprising:
a shut-off valve comprising:
a closure member movable between an open position and a closed position,
an electromagnetic actuator assembly comprising an electromagnetic field generator and a movable assembly to which the closure member is attached, the movable assembly being magnetically associated with the electromagnetic field generator and movable between first and second positions that respectively correspond to the closed and open positions of the closure member, and
a manual actuator capable of being coupled to and subsequently decoupled from the movable assembly, the manual actuator movable between a first axial position and second axial position, in the first axial position the manual actuator is coupled with the movable assembly in a manner that causes the movable assembly to move from the first position to the second position as the manual actuator is moved from the first axial position toward the second axial position,
wherein when in the second axial position the manual actuator is not coupled to the movable assembly and the movable assembly is configured to be moved from the second position to the first position upon the electromagnetic field generator receiving an electrical pulse to produce an electromagnetic field;
a sensor that is configured to produce a wired or wireless signal;
a remote control unit configured to receive the wired or wireless signal from the sensor and to in turn to transmit a signal in response to receiving the wired or wireless signal; and
a controller electrically coupled to an electrical power source, the controller configured to receive the signal from the remote control unit and in response to the signal to generate and send the electric pulse to the electromagnet field generator of the shut-off valve.

38. A system according to claim 37, wherein the sensor is a smoke detector.

39. A system according to claim 37, wherein the sensor is a carbon dioxide sensor.

40. A system according to claim 37, wherein the sensor is an earthquake sensor.

41. A system according to claim 37, wherein the sensor is a timer.

42. A system according to claim 37, wherein the sensor is a temperature sensor.

43. A system according to claim 37, wherein the sensor is a gas leakage sensor.

44. A system according to claim 37, wherein the remote control unit is a smart phone or a tablet.

* * * * *